R. SHALER.
Gridiron.

No. 65,614.

Patented June 11, 1867.

Witnesses:
John N. Shumway
A. J. Tibbits

Inventor:
Reuben Shaler
By his Attorney
Jno. E. Earle

United States Patent Office.

REUBEN SHALER, OF MADISON, CONNECTICUT.

Letters Patent No. 65,614, dated June 11, 1867.

COVERS FOR GRIDIRONS.

*The Schedule referred to in these Letters Patent and making part of the same.*

TO ALL WHOM IT MAY CONCERN:

Be it known that I, REUBEN SHALER, of Madison, in the county of New Haven, and State of Connecticut, have invented a new improvement in Cover for Cooking-Utensils; and I do hereby declare the following, when taken in connection with the accompanying drawings and the letters of reference marked thereon, to be a full, clear, and exact description of the same, and which said drawings constitute part of this specification, and represent, in—

Figure 1:
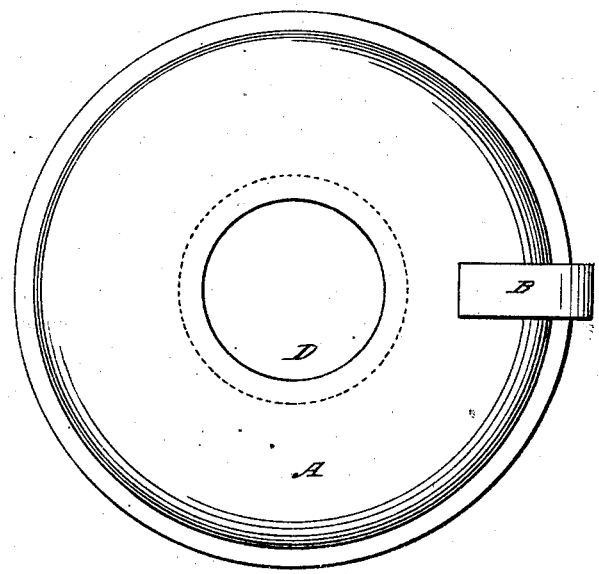
Figure 2:
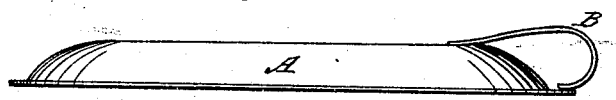

Figure 1, a top view.
Figure 2, a side view; and in
Figure 3, a central section.

This invention is designed as a cover for frying-pans, the object being to prevent the fat from "spattering" over, and yet so as to permit the steam therefrom, and consists in forming an opening through the top of the cover, and in the peculiar manner of protecting the opening so that while it permits the free exit of the steam it prevents the escape of the fat; and in order to the better understanding of my invention, as well as to enable others to construct the same, I will proceed to a description thereof, as illustrated in the accompanying drawings.

Figure 3:
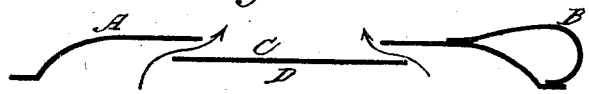

A is a cover formed from sheet or other metal in the usual manner, and provided with a handle, B, or not, and through the top of the cover is formed an opening, C, as seen in figs. 1 and 3. Beneath the said opening C I arrange a plate, D, larger than the opening C, and attach to the cover, so as to leave a space between the plate D and the cover. This completes the construction.

The cover is placed upon the frying-pan in the usual manner; the steam from the cooking passes freely out between the plate D and the cover, but the plate D being so much larger than the opening C, prevents the spattering fat from passing out through the same opening. It is well known that articles being fried cannot properly be covered by a close cover, or one which would not permit the exit of steam, and yet it is very desirable to prevent the spattering of the fat. This my improved cover does to the fullest extent.

Having thus fully described my invention, what I claim as new and useful, and desire to secure by Letters Patent, is—

A cover having an opening, C, and protected from below by a plate, D, substantially as and for the purpose specified.

REUBEN SHALER.

Witnesses:
  HENRY L. SHALER,
  GEO. L. DOWD.